(12) United States Patent
Mueller

(10) Patent No.: US 8,566,991 B2
(45) Date of Patent: Oct. 29, 2013

(54) METHOD FOR MANUFACTURING A WATERPROOF AND VAPOR-PERMEABLE SHOE AND SHOE OBTAINED WITH THE METHOD

(75) Inventor: Linda Mueller, Arosio-Alto Malcantone (CH)

(73) Assignee: GEOX S.p.A., Montebelluna (IT)

( * ) Notice: Subject to any disclaimer, the term of this patent is extended or adjusted under 35 U.S.C. 154(b) by 1043 days.

(21) Appl. No.: 12/594,424

(22) PCT Filed: Mar. 20, 2008

(86) PCT No.: PCT/EP2008/053418
§ 371 (c)(1),
(2), (4) Date: Oct. 2, 2009

(87) PCT Pub. No.: WO2008/119683
PCT Pub. Date: Oct. 9, 2008

(65) Prior Publication Data
US 2010/0115792 A1 May 13, 2010

(30) Foreign Application Priority Data
Apr. 3, 2007 (CH) ..................................... 0538/07

(51) Int. Cl.
*A43B 9/00* (2006.01)
*A43B 13/28* (2006.01)
*A43D 8/00* (2006.01)

(52) U.S. Cl.
USPC ............ 12/146 B; 12/146 C; 12/142 T; 36/45

(58) Field of Classification Search
USPC ......... 12/142 T, 146 B, 146 C, 142 A; 36/45, 36/55, 14, 12, 4
See application file for complete search history.

(56) References Cited

U.S. PATENT DOCUMENTS 5,253,434 A * 10/1993 Curley et al. ...................... 36/55
5,983,524 A * 11/1999 Polegato .......................... 36/3 R (Continued)

FOREIGN PATENT DOCUMENTS

CN 1234725 A 11/1999
CN 1446057 A 10/2003

(Continued)

OTHER PUBLICATIONS

The Extended European Search Report issued Feb. 27, 2012, in European Patent Application No. 12152897.0.
First Examination Report issued Mar. 9, 2011, in China Patent Application No. 200880011232.X (English translation only).

*Primary Examiner* — Jila M Mohandesi
(74) *Attorney, Agent, or Firm* — Oblon, Spivak, McClelland, Maier & Neustadt, L.L.P.

(57) ABSTRACT

A method for manufacturing a waterproof and vapor-permeable shoe, including preparing a semi-manufactured component of an upper for a shoe, to be arranged spread out on one or two flat surfaces, arranging on the inner part of the semi-manufactured component of an upper a waterproof and vapor-permeable membrane, then preparing an adhesive bonding between the semi-manufactured component of an upper and the membrane so as to not inhibit the vapor-permeability of the assembly. Flat shapes, suitable of shaping complementarily with respect to different thicknesses of stitched seams and of superimposed parts are prepared, and the membrane is coupled to the semi-manufactured component of an upper, with the outer part arranged resting on the shape. The upper is finished associated with an insole, and a sole.

31 Claims, 8 Drawing Sheets

(56) References Cited

U.S. PATENT DOCUMENTS

| | | | |
|---|---|---|---|
| 6,065,227 A * | 5/2000 | Chen | 36/4 |
| 6,497,786 B1 * | 12/2002 | Kilgore et al. | 156/379.8 |
| 6,839,984 B2 * | 1/2005 | Polegato | 36/3 B |
| 7,823,297 B2 * | 11/2010 | Polegato Moretti | 36/3 R |
| 8,245,417 B2 * | 8/2012 | Polegato Moretti | 36/30 R |
| 2002/0040537 A1 | 4/2002 | Polegato Moretti | |
| 2002/0148139 A1 | 10/2002 | Lain | |
| 2003/0115679 A1 * | 6/2003 | Morlacchi et al. | 8/115.51 |
| 2007/0199210 A1 | 8/2007 | Vattes et al. | |
| 2008/0127426 A1 | 6/2008 | Morlacchi et al. | |

FOREIGN PATENT DOCUMENTS

| | | |
|---|---|---|
| CN | 1910033 A | 2/2007 |
| EP | 1 825 996 A1 | 8/2007 |
| WO | WO 97/14326 | 4/1997 |
| WO | 02 11571 | 2/2002 |
| WO | WO 2004/089609 A1 | 10/2004 |
| WO | WO 2005/070658 A2 | 8/2005 |
| WO | 2007 120064 | 10/2007 |

* cited by examiner

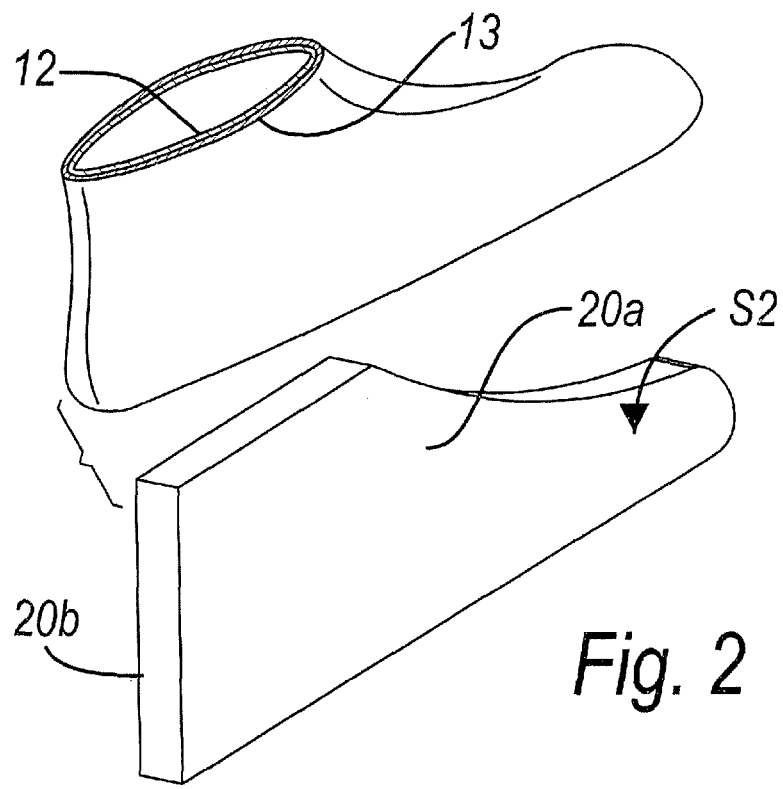
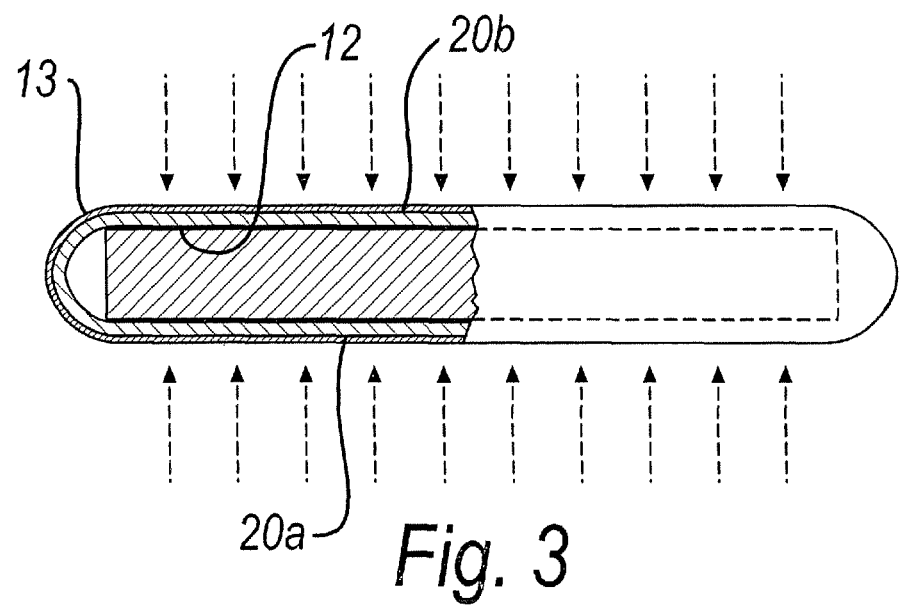

METHOD FOR MANUFACTURING A WATERPROOF AND VAPOR-PERMEABLE SHOE AND SHOE OBTAINED WITH THE METHOD

TECHNICAL FIELD

The present invention relates to a method for manufacturing a waterproof and vapor-permeable shoe.

The invention also relates to a shoe obtained with the method.

BACKGROUND ART

It is now well-known that the comfort of a shoe is linked not only to correct anatomical configuration of the fit but also to correct outward permeation of the water vapor that has formed inside the shoe due to sweating.

Traditionally, vapor-permeable shoes are those which use natural materials such as leather or equivalent products, which however, in the presence of rain or bad weather, because of their vapor-permeable properties, do not ensure good waterproofing and indeed absorb rather easily water which can penetrate also through the stitched seams used for assembly.

For this reason, several types of shoes have been widely commercially available for a few years now which have an upper which is coupled to a lining with a vapor-permeable and waterproof membrane (for example made of a material such as Gore-Tex® or the like).

A shoe of this type is disclosed for example in U.S. Pat. No. RE34,890.

The shoe disclosed in such patent has a sock-shaped lining, constituted by a fabric which is coupled to a waterproof and vapor-permeable membrane, which not only prevents the water from penetrating into the shoe but also allows the foot to have outward vapor permeation.

This shoe, however, suffers drawbacks, since it still allows water to penetrate through the upper and to generate a retention of water between the waterproofing lining and the inner surface of the upper.

This causes the shoe to require considerable time to dry even after it has been used.

This stagnation phenomenon, moreover, causes an unpleasant feeling of moisture and coldness and a consequent increase in the weight of the shoe, therefore reducing user comfort.

Moreover, such shoe necessarily requires the use of an inner lining onto which a waterproof and vapor-permeable membrane is coupled, with a consequent increase in production costs.

The association between a membrane and a support, be it felt, fabric or leather, is widely known in the field of shoes and clothing, but adhesive bonding generally occurs always between simple materials, in rolls or pieces, substantially without stitched seams and overlaps. Examples of these methods can be found in patents DE2737756 and WO90/969.

The materials thus waterproofed, in order to be usable in the manufacture of a shoe, must be subsequently cut and sewn and the stitched seams in turn must be rendered waterproof, for example by means of suitable taping processes. However, this method has the disadvantage that such stitched seams are generally difficult to waterproof due to the different thicknesses of the different materials that compose the finished product.

Moreover, the stitched seams and the overlaps of the different elements that compose an upper for shoes are the most critical point in its manufacture.

In order to obviate this work method for manufacturing the shoe, a method has been devised in the past which might allow easy direct adhesion between the upper and the membrane. WO02/11571 and WO2004/112525 in fact disclose a process and equipment for waterproofing an upper which has already been manufactured.

Such process provides for turning inside out the upper of the shoe, at the last stage of its preparation, before it is associated with the sole, and fitting it on an appropriately provided last, which is rigid but can be adapted so as to tension the upper. Depending on the patent, one or two sheets of waterproof and vapor-permeable membrane provided with adhesive and heat-sealed at their ends are then pressed, by using particular equipment, such as for example a heated air bell press, against this three-dimensional assembly, which is constituted by the adaptable rigid last provided with the upper. Finally, the upper is removed from the adaptable last and is turned inside out so that it can be glued to the sole, after being associated with the assembly insole.

However, the above manufacturing method has some limitations and drawbacks.

A first limitation is related to the need for particularly elastic membranes, thus excluding all inextensible ones, on penalty of breakage during adaptation to the three-dimensional last.

A second limitation is related to the watertightness of the shoe, both proximate to sewn elements and inserts of the upper and in particular at the region where the sole is joined to the membrane-upper assembly. This method is unable to ensure perfect adhesion of the membrane proximate to the stitched seams and to the overlaps of the inserts which constitute the upper.

A third limitation is related to the manufacturing method, which is onerous in terms of production times and equipment, which is complicated due to the need to press a three-dimensional assembly.

DISCLOSURE OF THE INVENTION

The aim of the present invention is to provide a method for manufacturing a waterproof and vapor-permeable shoe which is simple and quick and allows to use uncomplicated equipment.

This aim and other objects, which will become better apparent hereinafter, are achieved by a method for manufacturing a waterproof and vapor-permeable shoe, which consists of the following steps:

preparing a semimanufactured component of an upper for a shoe which is completely open so that it can be spread out on a flat surface, arranging on the inner portion of said upper a waterproof and vapor-permeable membrane, preparing means for adhesive bonding between the upper and the membrane so as to not inhibit the vapor-permeability of the assembly, preparing one or more shapes, which are substantially flat but are capable of shaping themselves complementarily with respect to the different thicknesses of the stitched seams and of the superimposed parts which constitute the outer surface of said upper, firmly coupling said membrane to said upper, with the outer portion of said upper arranged so that the outer surface rests on the shape, finishing said upper by providing the missing couplings, making it assume a three-dimensional configuration and associating it with an insole, associating a sole with the waterproofed upper and with the insole.

BRIEF DESCRIPTION OF THE DRAWINGS

Further characteristics and advantages of the invention will become better apparent from the description of a preferred but not exclusive embodiment thereof, illustrated by way of non-limiting example in the accompanying drawings, wherein:

FIG. 2 is a schematic perspective view of an upper stitched to the heel, with a membrane which is waterproof and permeable to water vapor associated therewith, shown in an exploded view with respect to a shape for pressing said membrane onto the upper;

FIG. 3 is a schematic sectional top view of a stitched upper, with a membrane which is waterproof and permeable to water vapor associated therewith, coupled to a shape for pressing said membrane onto the upper;

It is noted that anything found to be already known during the patenting process is understood not to be claimed and to be the subject of a disclaimer.

WAYS OF CARRYING OUT THE DRAWINGS

Figure 5:
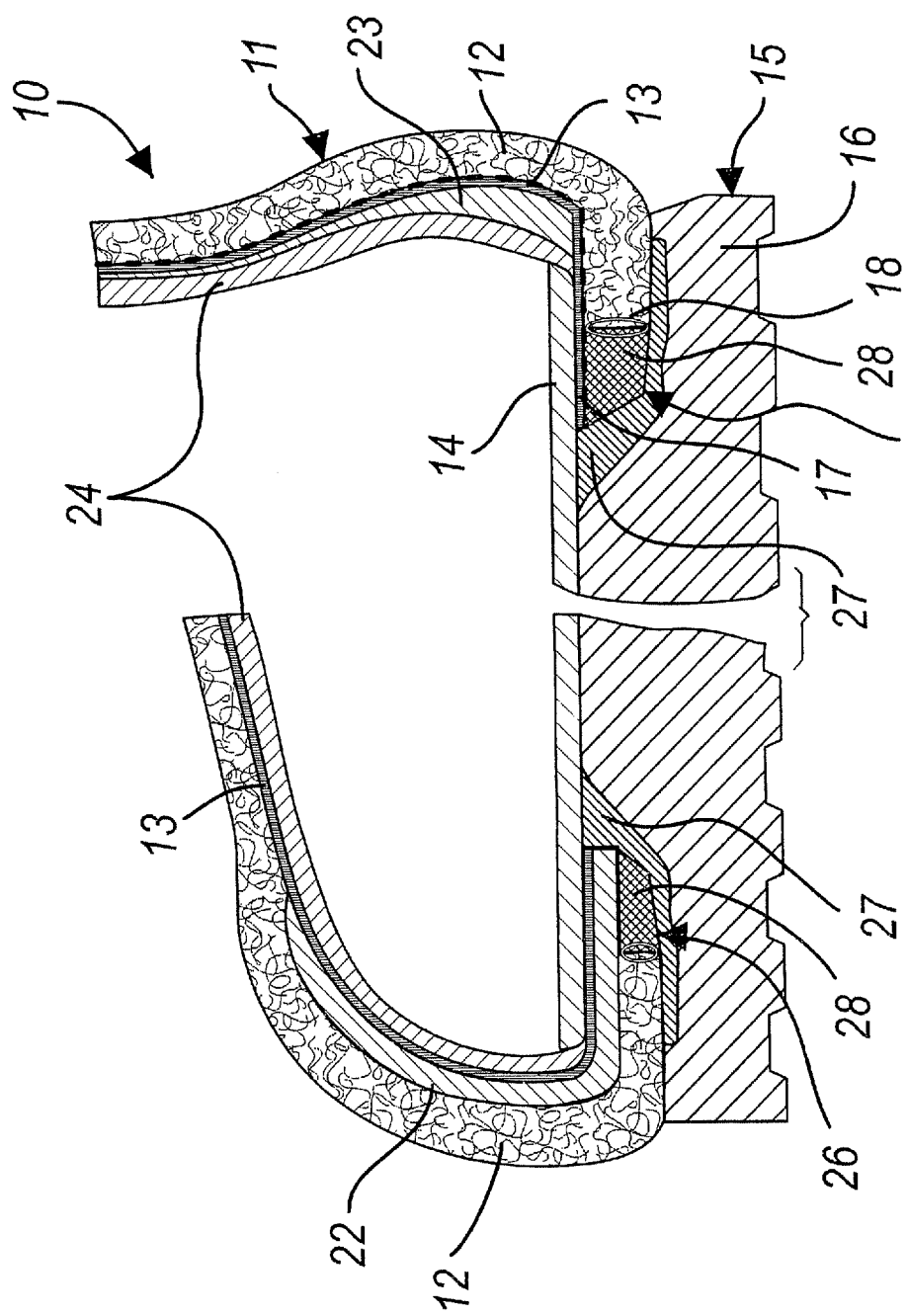
FIG. 5 is a schematic longitudinal sectional view of a first embodiment of a portion of a shoe according to the invention.

With reference to the figures, a shoe manufactured with the method according to the invention is generally designated by the reference numeral 10 and can be seen in FIG. 5.

The shoe 10 comprises an upper part 11 constituted by an upper 12, which is vapor-permeable (or, equivalently, provided with small perforations, such as for example uppers for summer shoes constituted by mesh fabrics or the like), by a membrane 13, of the type which is waterproof and permeable to water vapor (such as for example those commonly known by the trade-names "Gore-Tex" or "Sympatex"), associated with the inner portion of the upper 12, and an insole 14 which is associated with the assembly formed by the upper 12 and the membrane 13.

Below the upper part 11, under the insole 14, there is a lower part 15 constituted by a sole 16.

A method for manufacturing the shoe 10 is described hereafter.

This method provides for the application to the upper 12 of at least one sheet of membrane 13, which is optionally coupled, without compromising its vapor-permeability, to one or more meshes made of synthetic material and/or other protective or supporting elements which allow the passage of sealing materials.

This membrane can cover completely the inner surface of the upper 12.

As an alternative, at elements which constitute the upper 12 and are already waterproof it is possible to avoid use of the membrane 13.

In this case it is therefore possible to save advantageously a considerable surface of membrane.

What is important is that there is a waterproof seal between the membrane 13 and the waterproof materials, such as for example an overlap and a seal of the membrane with respect to the waterproof materials substantially along approximately 5.0-10.0 mm or a stitched seam which is waterproofed by a waterproof taping.

For the subsequent assembly of the upper part 11 to the sole 16, it is advantageous to leave the lower margin or flap 17 of the membrane so that it protrudes (see FIG. 5), for example by 10-15 mm, from the lower edge 18 of the upper 12.

For the mutual assembly of the upper 12 and the membrane 13, for example, it is possible to distribute, on the surface of the membrane 13 in contact with the upper 12, so as to not compromise its vapor-permeability, a certain amount of thermo-adhesive glue.

This distribution is preferably a distribution of powder of adhesive, for example of the polyurethane (PU) type, or with spots of adhesive of the hot-melt type, which have a diameter from 0.1 to 2.0 mm and a density from 50 to 600 spots/cm$^2$.

By heating the membrane 13 to approximately 100-150° C. for 10 seconds during pressing at approximately 6 bars, perfect adhesion with the upper 12 is achieved.

Adhesion can be promoted also by means of a perforated thermo-adhesive film (web) to be applied between the membrane 13 and the upper 12, so as to not compromise the vapor-permeability of the assembly.

Figure 1:
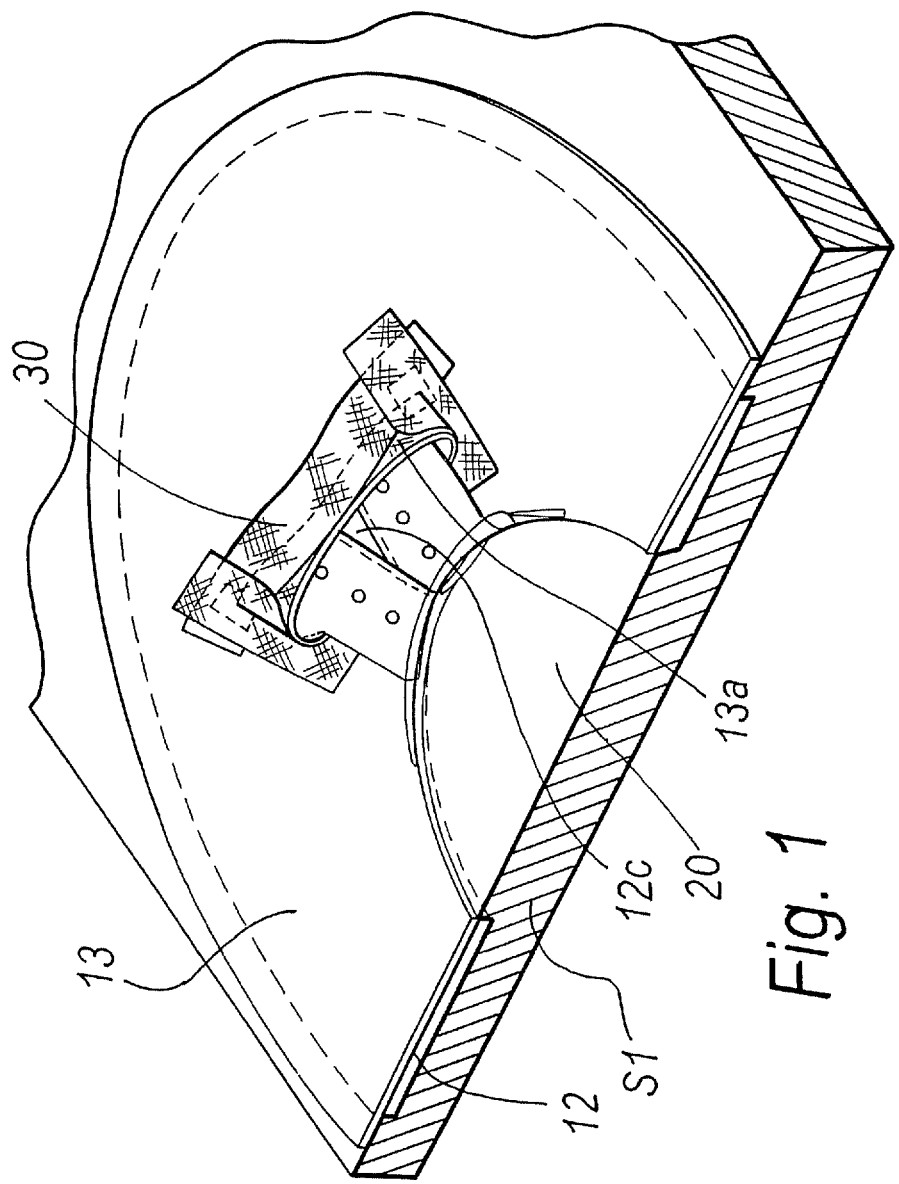
FIG. 1 is a schematic perspective view of the step for coupling a membrane which is waterproof and permeable to water vapor to the inner surface of an upper with a heel which has not been stitched.

In an embodiment which might be defined as two-dimensional, the upper 12 is almost completely assembled but not sewn for example in the heel region, so that it can be spread out onto a flat surface (for example a flat shape, designated by the reference sign S1), shown in FIG. 1 and designated by the reference numeral 20.

The manner in which the upper is spread out, i.e., in which regions it is not sewn, for example in the heel or in the toe or in both, is not important.

The coupling of the assembly occurs by hot-pressing the membrane 13 (and of course the interposed thermo-adhesive glue) onto the upper 12, for example by means of a simple flat or cylindrical press provided with heating means, or a heated air cushion; as an alternative, it is also possible to join the membrane to the upper in vacuum; hot pressing allows the melting of the adhesive and the joining of the membrane to the upper.

The surface onto which the membrane is positioned can also be slightly curved, concave or convex, in order to facilitate pressing, provided that the arrangement of the upper remains flat and not closed.

Since in general the upper 12 is manufactured by overlap sewing of a number of elements, inserts, metallic accessories and particular closures, the flat surface 20 must be made of a material which is capable of resuming its original shape after deformation (resilient) and is temperature-resistant, such as nitrile rubber, silicone, polychloroprene or expanded microporous EVA, so as to eliminate irregularities in thickness and ensure that the inner surface of the upper is flat during pressing; this refinement is essential for adhesion of the membrane 13.

Figure 4A:
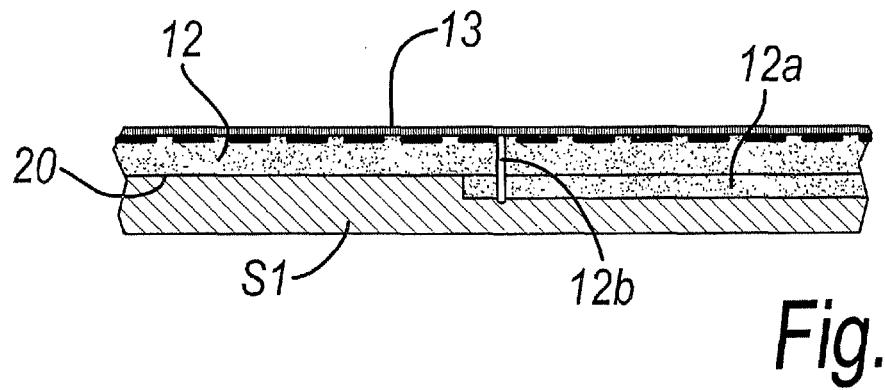
FIGS. 4a, 4b and 4c are sectional views of an upper with a membrane arranged on the pressing shapes according to the invention.
Figure 4B:
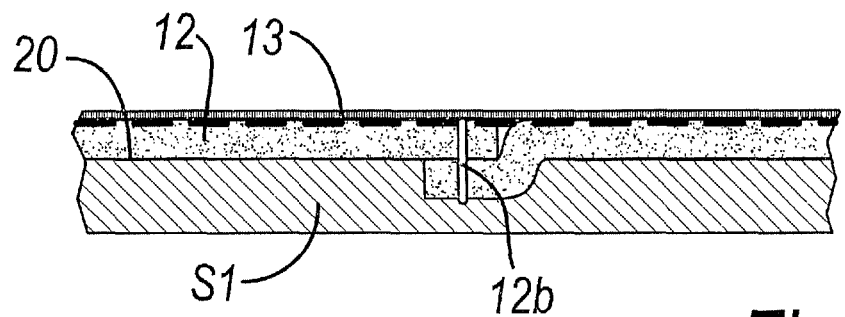

It is important that the inserts 12a or the sewing regions 12b (see FIGS. 4a and 4b) with superimposed flaps of the upper are "absorbed" by the flat surface 20 in order to allow flat pressing of the membrane 13 onto the upper 12 and therefore complete adhesion of the critical points, thus preventing infiltration of water for example in bubbles which have not bonded.

Figure 4C:
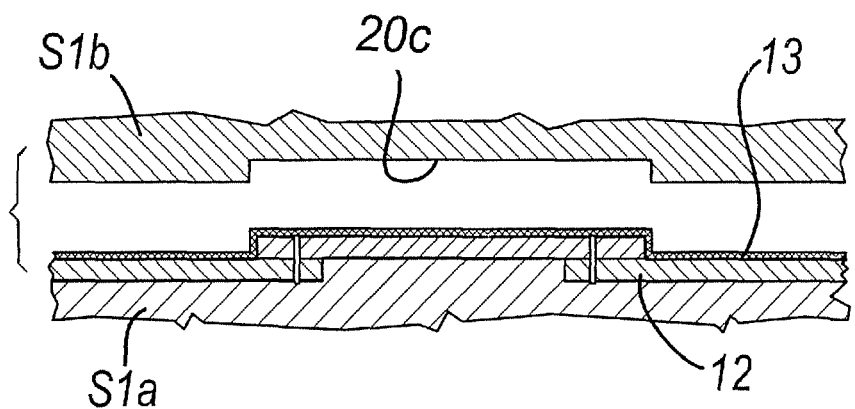

If the flat surface 20 is made of rigid materials (FIG. 4c), for example resin, aluminum, brass, rigid microporous EVA, polyurethane, which are resistant to temperature and pressure, the surface or shape must have small cavities 20c which are complementary with respect to, for example, the overlaps of the elements, the differences in thicknesses or the stitched seams of the upper, so as to again ensure that the inner surface of the upper (the membrane pressing surface) is flat.

Again to achieve perfect flat adhesion of the membrane to the upper, it is further possible to use rigid shapes S1a and complementary shapes S1b which have cavities and protrusions which are opposite to each other, or not, and in this case also, for example, are complementary with respect to the differences in the thicknesses of the upper.

For a better result, it is preferable to perform two different pressings, first on one half of the assembly constituted by the membrane 13 and the upper 12 and then on the other one, so as to achieve a correct coupling also on the central tongue, designated by the reference numeral 12c, of the upper 12.

With reference to FIG. 1, the "tongue" is the strip, generally made of the same material of which the upper is made, which is arranged at the fastening, or at the different mechanisms for opening the shoe, to protect the foot instep and facilitate the opening of the shoe and the insertion of the foot. In the case of waterproof uppers, the tongue is provided as a bellows tongue, folding back onto itself when the shoe closes, thus making the shoe more waterproof while allowing easy foot insertion.

If membrane inserts 13a are needed in this region to provide the required bellows portion needed to waterproof the tongue and prevent water from penetrating into the shoe, such inserts must be superimposed, for example by 5-10 mm, and sealed by means of sealing adhesives and/or tapes 30, applied by means of suitable thermo-welding processes.

Once this flat adhesion between the open upper 12 and the membrane 13 has been performed, if necessary, the manufacture of the upper 12 is ended by using one or more stitched seams of the edges left open to allow two-dimensional pressing and by a consequent waterproof sealing of the stitched seams.

As an alternative, in an embodiment which can be defined as three-dimensional, it is possible to prepare an upper, again designated by the reference numeral 12 in this example, which is turned inside out and closed (see FIGS. 2 and 3: FIG. 2 illustrates the assembly constituted by the inside-out upper 12 and the membrane 13 during coupling to a shape S2, while FIG. 3 is a top sectional view of the upper with the membrane fitted on the shape S2), and a membrane 13, which is shaped and sewn so as to duplicate substantially the shape of the upper 12.

For example, the membrane 13 can be formed by two portions which are sewn at the four ends or by a single portion which is folded and sewn at the two mating ends.

The membrane 13 is wrapped around the upper 12.

The three-dimensional solution is reduced in this case also to a substantially two-dimensional adhesion by fitting the assembly onto a flat shape S2 (which in particular has two flat and parallel faces) constituted by a core made of rigid material and by an outer surface portion, which forms the two outer flat surfaces 20a and 20b and is made of a material which is capable of resuming its original shape after a deformation (resilient) and is temperature-resistant, such as for example nitrile rubber, silicone, polychloroprene (neoprene), or microporous expanded EVA.

In this case also, coupling can occur by pressing, preferably with heat, or in vacuum, with the equipment described above for the open upper.

In this case, it is preferable to perform two different pressings, first on one side and then on the other side of the assembly constituted by the upper 12 and the membrane 13, fitted onto the flat shape S2.

Completion of the adhesion between the upper 12 and the membrane 13 in the portion of the heel can occur also by using a shoe manufacturing machine commonly known as "counter preforming machine", which has a heated half-last and an air cushion which applies pressure to the upper 12 and to the membrane 13, which are superimposed.

In this case, the half-last is heated so as to reactivate the thermo-adhesive glue, while the air cushion is designed to press the materials and achieve their mutual adhesive bonding. In this case, for example, pressing occurs while the upper is not turned inside out.

Both the flat shape and the half-last of the "counter preforming machine" can be used for all kinds of shoes without having to change equipment when the type of upper changes.

A toe cap 22, made of waterproof material, is generally applied to the upper 12 in order to reinforce the tip of the shoe. In this case, there is no need to use part of the membrane 13, which in FIG. 5 is superimposed on the waterproof toe cap 22. It is therefore possible to save a considerable surface of the membrane 13. What is important is that there is a waterproof seal, for example an overlap and a sealing adhesive bonding of the two materials over approximately 5.0-10.0 mm or a stitched seam with waterproof taping between the toe cap 22 and the membrane 13. The toe cap 22 is applied advantageously directly to the upper 12, before the association of the membrane 13 with the upper 12, or as an alternative can be applied subsequently, partly overlapping the membrane 13.

If the toe cap 22 is vapor-permeable or perforated and not waterproof, it can be applied to the upper 12, for example by spot gluing or by interposing a perforated film made of thermoplastic material, so as to ensure its vapor permeability. In this case, the presence of the waterproof and vapor-permeable membrane is necessary.

Subsequently, according to a per se known method, once the assembly has been fitted onto the insole it is necessary to flatten by roughing the lower edge 18 of the upper 12, in order to eliminate the assembly thicknesses and creases and facilitate its adhesive bonding with the sole 16; such flattening can even reveal the lower perimetric end of the toe cap 22.

If the toe cap 22 is absent, it is instead preferable to avoid the roughing operation in order to not ruin the membrane 13.

The membrane 13 is in fact generally made of an extremely thin and fragile material, and the operation for removing the creases of the upper 12 by roughing might easily tear it.

Likewise, it is possible to apply a rear counter 23, for example after the association of the membrane 13 with the upper 12.

In this case also, if the counter 23 is made of waterproof material, then there is no need to use part of the membrane so that it overlaps such element. It is therefore possible to save on membrane surface. What is important is that there is a waterproof seal, for example an overlap with a sealing adhesive bonding of the two materials over approximately 5.0-10.0 mm or a stitched seam with waterproof taping, between the counter and the membrane.

A vapor-permeable inner lining 24 is associated with the inner surface of the membrane 13; association can occur by adhesive bonding.

As an alternative, the lining can be provided in the form of a sock, to be associated internally with the assembly constituted by the upper, the membrane, and the insole once it has been provided.

Finally, the vapor-permeable and/or perforated insole 14 is applied to the assembly constituted by the upper 12 and the membrane 13 so as to complete the upper part 11 of the shoe 10 before the adhesive bonding of the sole.

The perimetric flap 17 of the membrane 13 and the perimetric edge 18 of the upper 12 are folded back and fixed below the insole 14.

In particular the association of the upper 12 and the membrane 13 with the insole 14 occurs for example by means of the structure known as "AGO lasting", without the use of nails or staples which might damage the membrane 13.

Once the upper part 11 of the shoe has been closed, the sole 16 is associated with it.

In this embodiment, the sole 16 is a single block and is associated with the upper part 11 for example by means of adhesive.

For the purposes of the present invention, it is important that between the lower flap 17 of the membrane 13 and the lower edge 18 of the upper there is a sealing area 26 which is waterproof with respect to the underlying part of the shoe, in this case the sole 16.

The waterproof sealing area 26 can be constituted by an adhesive material which is spread onto the lower edge 18 of the upper 12, on the lower flap 17 of the membrane 13, until it reaches the insole 14, in practice so as to form a sealing ring 27. The sealing ring 27 also allows the adhesion of the sole 16 to the upper part 11 of the shoe.

The sole 16 can also be overmolded directly onto the upper part 11; in this case, depending on the polymeric material that composes the sole, it is possible to avoid the use of the sealing ring 27, since the sealing area 26 is provided by the polymeric material of the sole which bonds intimately with the portion of the upper part 11 with which it comes into contact (the lower edge 18 of the upper, the lower flap 17 of the membrane and part of the insole 14).

The sealing area 26 can also be provided with other methods, sealing tapings, or also extensions 28 of the lower edge of the upper, obtained by means of elements which are fixed to the upper for example by stitching or adhesive bonding.

The function of these extensions 28 is also to protect the lower edge of the membrane 13. Since the membrane is extremely thin, it might in fact break as a consequence of the operation for lasting the assembly constituted by the membrane 13 and the upper 12 around the insole 14 due to the lasting pliers of the lasting machine.

The extensions 28, which are for example 10-15 mm wide (in practice such as to reach the end of the membrane flap), must allow sealing, such as for example heat-sealing tapes or meshes made of synthetic material, web-like fabrics, weaved fabrics or three-dimensional fabrics, through which sealing materials, such as for example silicone or polyurethane adhesives, can pass; in these cases, the membrane 13 must be applied after the coupling of the protective elements so as to waterproof the connecting point among the different materials.

In order to further strengthen the assembly margin of the membrane, it can be advantageous to apply directly to the lower edge of the membrane, for example after the association of the membrane with the upper, a waterproof reinforcement element, for example a waterproof heat-sealing tape, which is preferably elastic and is made of synthetic material.

In addition to monolithic soles, it is possible to apply to the upper part also composite soles, formed for example by a lower body which forms the tread and a mid-sole which is interposed between the insole and the lower body.

The methods of assembly of the composite sole to the upper part of the shoe (upper and insole) may be the most disparate, from adhesive bonding to multiple overmolding.

It is evident that the shoe can comprise a sole of the type which is waterproof and vapor-permeable, of a per se known type, embodiments of which are disclosed in prior patents; such soles are of the type which comprises a tread provided with through holes in at least one region thereof, above which there is a protective element and a membrane of the type which is waterproof and vapor-permeable and is similar to the one described above.

It is evident that the sealing area of the membrane and of the lower edge of the upper facing the sole, in the case of a vapor-permeable and waterproof sole, must necessarily be a waterproof sealing area which is arranged perimetrically and surrounds the region designed for vapor permeation.

Some embodiments of the shoe according to the invention which use a sole which is waterproof and vapor-permeable, as now described briefly, are described hereafter.

Figure 6:
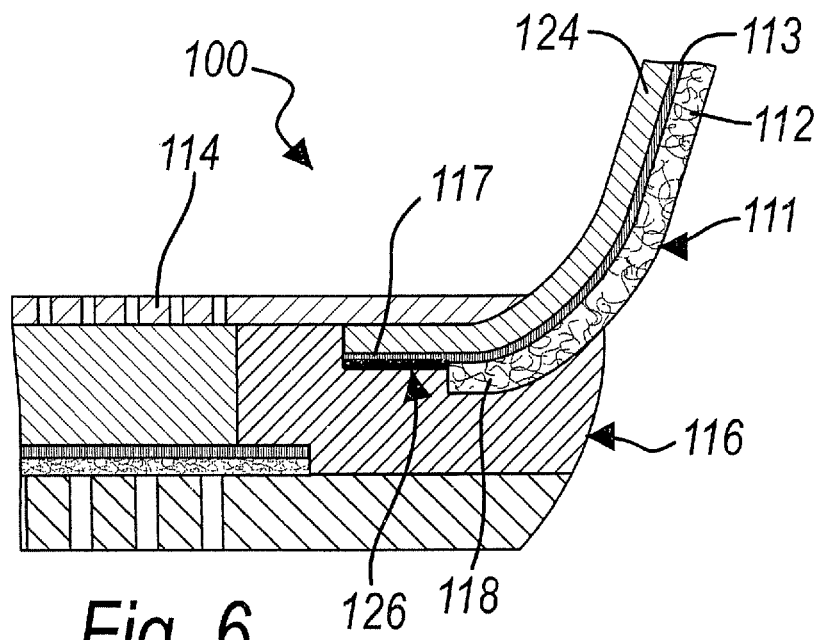
FIG. 6 is a schematic transverse sectional view of a second embodiment of a portion of a shoe according to the invention.

With reference to FIG. 6, according to WO97/14326, the lower edge 118 of the upper 112, to which the lower flap 117 of the membrane 113 adheres, is turned over and bonded with adhesive below the insole 114, according to a structure commonly known as "AGO lasting", without using nails or staples which might damage the membrane.

A lining 124 is joined to the inner face of the membrane 113.

The membrane 113 is left exposed for example by at least 10-15 mm with respect to the lower edge 118 of the upper, so as to form a perimetric sealing area 126 which is waterproof with the underlying part of the shoe, which in this case is constituted by the polymeric material of the sole 116; the sole 116 is in fact overmolded directly onto the assembly of the upper part 111 which completely wraps around the foot.

Figure 7:
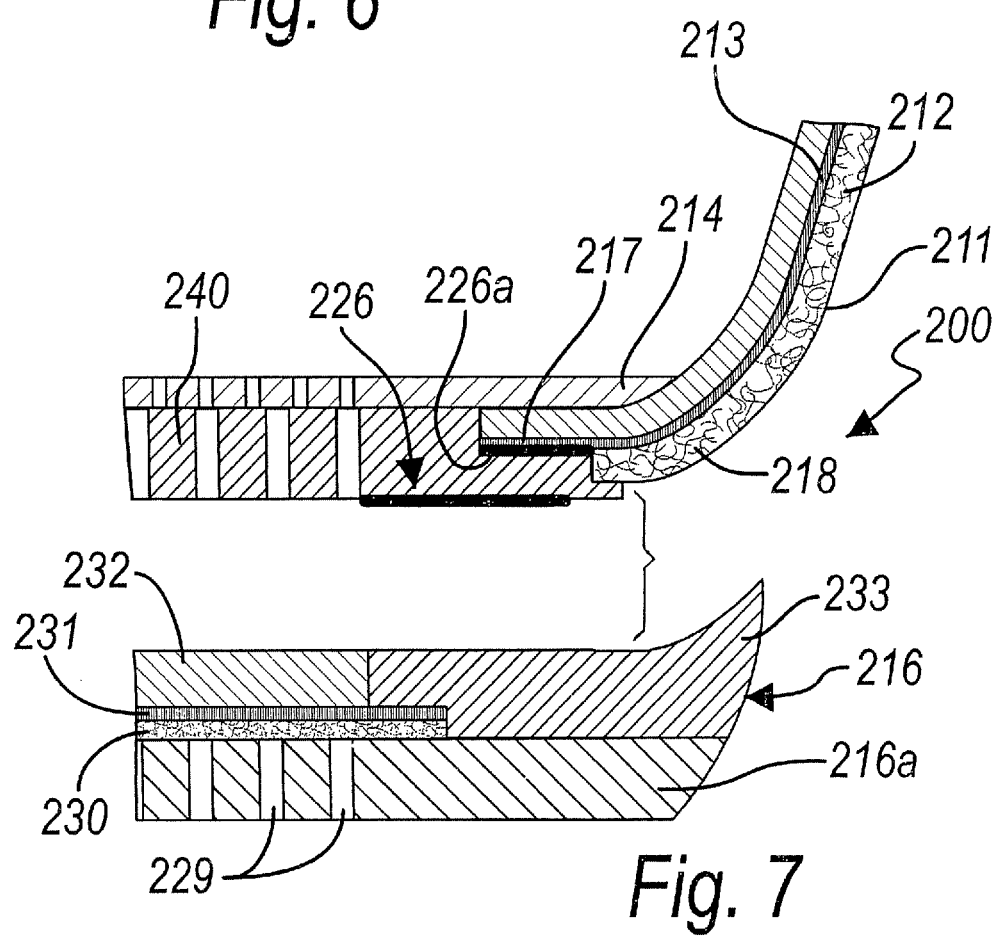
FIG. 7 is a schematic and partially exploded transverse sectional view of a third embodiment of a portion of a shoe according to the invention.

With reference to FIG. 7, according to WO 2005/070658, after the association of the lower edge 218 of the upper 212 and of the lower flap 217 of the membrane 213 with the assembly insole 214, a waterproof inshoe 240 is used which is associated perimetrically with the insole 214 and with the membrane 213 of the upper 212, so as to be superimposed on the region connecting the insole 214 and the membrane 213 and on the lower edge 218 of the upper 212, providing a first perimetric seal 226a which avoids the lateral infiltration of water from the lower edge 218 of the upper 212 above the inshoe 240 and allows to "level" any creases and wrinkles due to the assembly of the lower edge 218 of the upper 212 and lower flap 217 of the membrane 213.

The waterproof inshoe 240 can be vapor-permeable or be provided with suitable holes at the region of the sole designed for vapor permeation.

For example, the inshoe 240 can be made of soft material, such as microporous EVA or expanded polyurethane, in order to adapt to the different thicknesses caused by the insole 214, the lower edge 218 of the upper, and the lower flap 217 of the membrane.

In an extreme case, the inshoe 240 can be provided centrally with a large hole, in practice thus reducing itself to a perimetric rim which is formed for example by a waterproof ring or tape, which provides a seal at the region connecting the upper, the membrane and the insole.

As an alternative to the inshoe 240, it is possible to impregnate the lower flap 217 of the membrane 213 and the lower edge 218 of the upper 212 with adhesives or sealants, such as for example silicone adhesives, thermoplastic adhesives or reactive hot-melt PU adhesives, such as for example the product IPATHERM S 14/176 or equivalent of H.B. Fuller, or spread them with latex (latex coating) or with polyurethane (PU coating), so as to provide a waterproof seal directly on the peripheral region of the upper with the membrane.

The sole 216, in this embodiment, is similar to the one shown in the previous described embodiment, and is constituted by a lower body 216a of a sole 216, which forms the tread, and has a region with a plurality of through holes 229, which lower body is molded separately; subsequently, the lower body 216a is placed in a mold and a protective layer 230 is arranged above the perforated region for a waterproof and vapor-permeable membrane, which is arranged at the holes 229 of the tread, hereinafter referenced as lower membrane 231 in order to distinguish it clearly from the membrane 213 associated with the upper 212; the protective layer 230 is made of a material which is resistant to hydrolysis, water repellent, vapor-permeable or perforated.

A vapor-permeable (or optionally perforated) filler element 232 is arranged over the lower membrane 231 and has a surface dimension which is smaller than that of the lower membrane 231, so as to leave exposed a perimetric annular region of such lower membrane.

Around the filler element 232 there is a mid-sole 233, which seals the annular region of the lower membrane 231 related to the sole 216, which is left exposed by the smaller filler element 232, so as to avoid penetration of liquids into the foot insertion region through the holes of the tread.

Figure 8A:
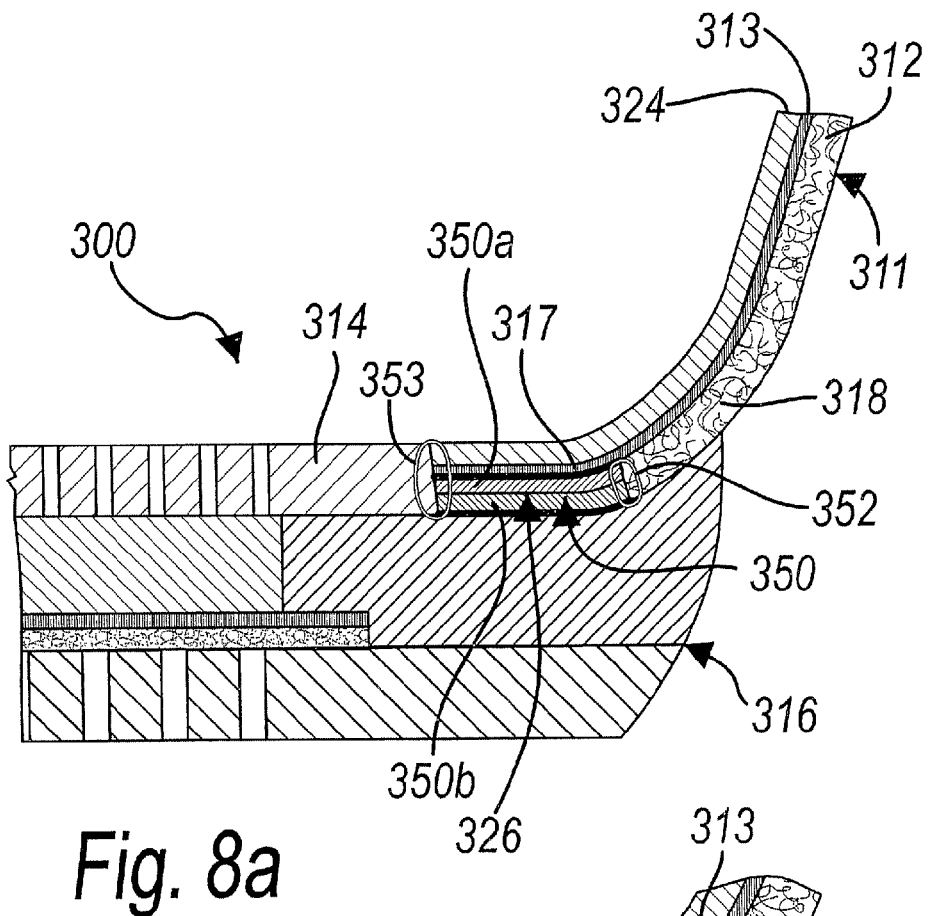
FIGS. 8a and 8b are respectively a schematic transverse sectional view of a fourth embodiment of a portion of a shoe according to the invention and an enlarged-scale view of a different embodiment thereof.

With reference to FIG. 8a, according to EP 1197158, before the coupling between the upper 312 and the membrane 313, a waterproof connecting element 350 is associated with the lower edge 318 of the upper 312, for example by zigzag stitches 352, and is for example 10-15 mm wide, in practice as wide as the lower flap 317 of the membrane 313 which protrudes from the lower edge of the upper.

The connecting element 350 is constituted preferably by a two-layer sheet, of which the inner layer 350a, directed toward the membrane 313, has a melting point which is equal to the temperature generated during the pressing of the membrane on the upper described previously; such temperature is lower than the temperature generated during the step for molding the sole.

During the pressing step, therefore, the inner layer 350a melts, adhering to the membrane 313.

The second layer, the outer one 350b, can instead be made of a material which is compatible with the material of the sole and must have a higher melting point than the first inner layer 350a, in order to avoid its melting during the operation for pressing the membrane 313 against the upper 312.

The assembly constituted by the upper 312 and the membrane 313 is joined by means of stitched seams 353 to the vapor-permeable or perforated insole 314 together with an inner lining 324, according to a structure commonly known as Strobel.

If the insole is associated with the upper-membrane assembly, according to the structure known as "AGO lasting", so that the lower edge of the upper and the lower flap of the membrane are folded under the assembly insole, the connecting element coincides with the extension of the lower edge of the upper, described previously.

At least part of the sole 316 is overmolded directly onto the upper part 311 of the shoe.

When the sole is injection-molded, the pressure and the heat generated by the melted polymer cause the partial melting of the second layer of the connecting element 350 (in addition to, of course, the first layer), thus creating the perimetric area 326 for waterproof sealing between the lower flap 317 of the membrane 313 and the sole 316, thus preventing the lateral infiltration of liquids.

Figure 8B:
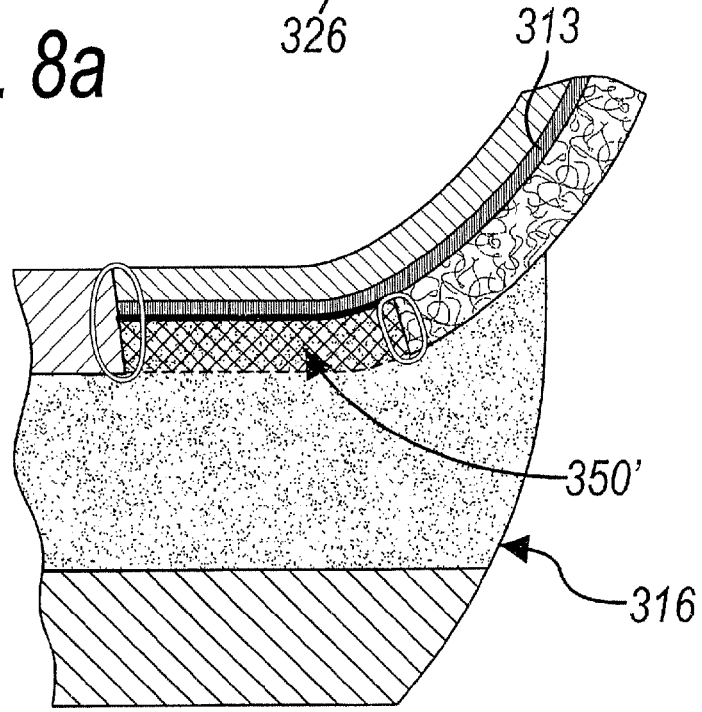

One variation which is already known to persons skilled in the art in the shoe manufacturing field is shown in FIG. 8b and provides for a connecting element or extension of the upper, designated by the reference numeral 350', which is made entirely of a material which is permeable to polymeric materials in the liquid state, particularly polyurethane, such as for example a mesh made of synthetic material or a three-dimensional fabric with a wide mesh which allows the polymeric material which has melted during the overmolding step to couple the sole to the membrane 313.

Figure 9:
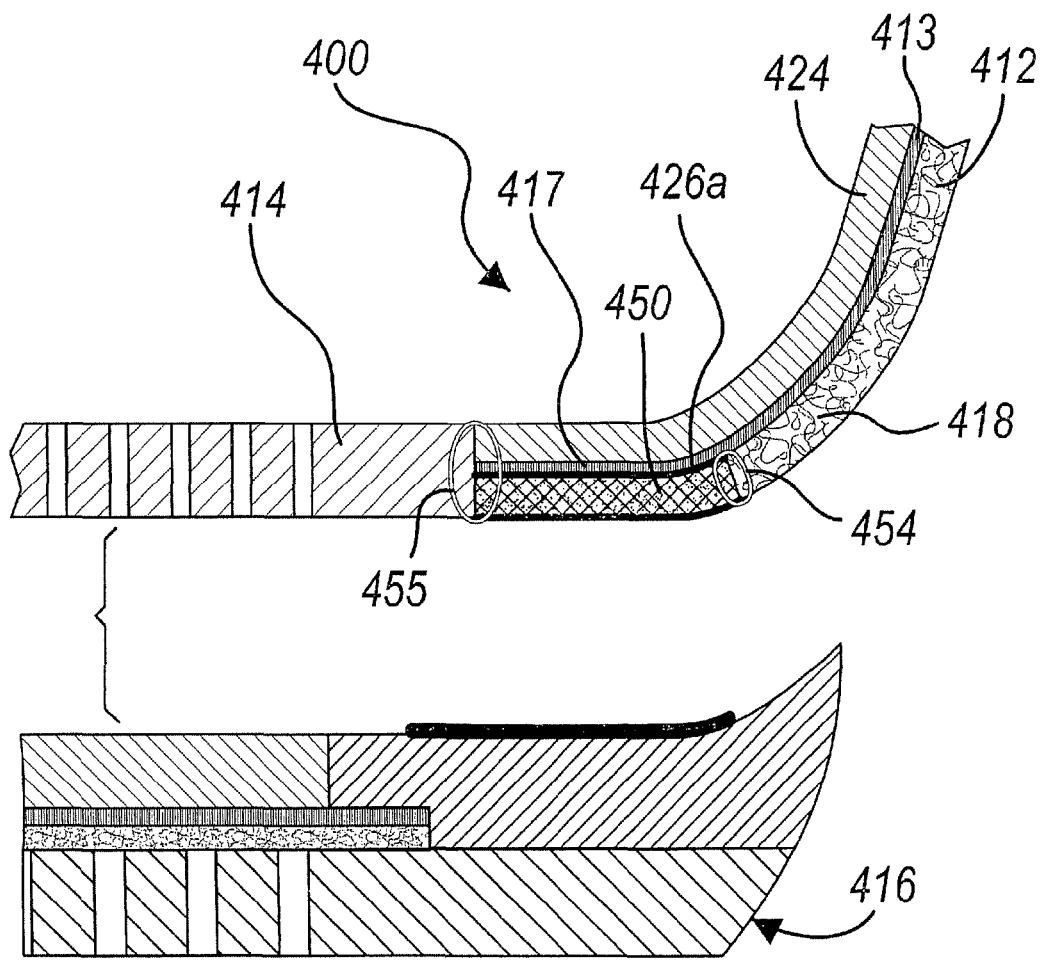
FIG. 9 is a schematic and partially exploded transverse sectional view of a fifth embodiment of a portion of a shoe according to the invention.

With reference now to FIG. 9, a sole 416 can also be provided autonomously and then joined to the upper part of the shoe for example by means of adhesive.

In this case, there is the association of the lower edge 418 of the upper 412 with the insole 414, which is vapor-permeable or perforated, with the interposition of a connecting element 450 made of a material which is permeable to fluid sealants, such as for example a net made of synthetic material or a three-dimensional fabric with a wide mesh.

Coupling is provided by means of stitched seams 454 and 455.

The connecting element 450 is impregnated with adhesives or sealants, such as for example silicone adhesives, thermoplastic or reactive hot-melt PU adhesives, such as for example the adhesive known by the trade-name IPATHERM S 14/176 or equivalent of H.B. Fuller, or spread with latex (latex coating) or with polyurethane (PU coating), so as to provide a first perimetric seal 426a for providing a waterproof seal directly on the lower flap 417 of the membrane 413.

Figure 10:
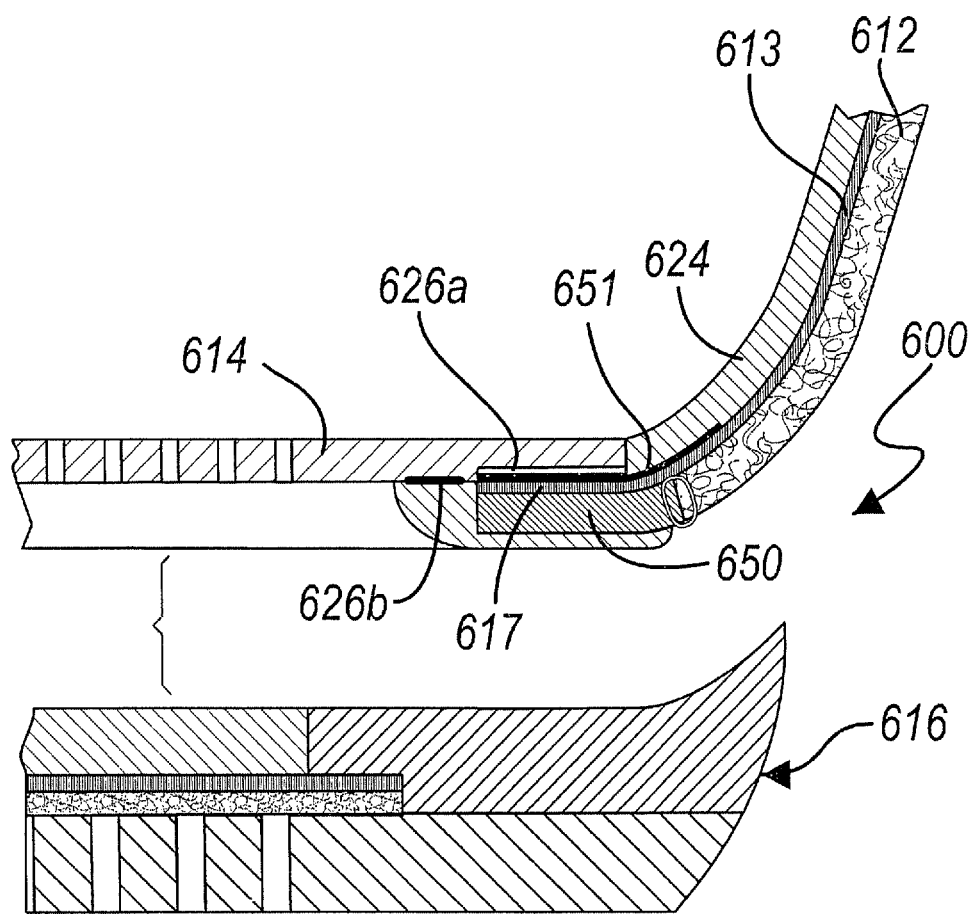
FIG. 10 is a schematic and partially exploded transverse sectional view of a sixth embodiment of a portion of a shoe according to the invention.

With reference to FIG. 10, for example in the case of an "AGO lasting" structure, the connecting element 650 can also be a normal fabric, capable of not entraining water inwardly or along its own fibers, a fabric reinforced with aramid fibers of Kevlar®, or for example a waterproof polymeric material.

In this case, the insole 614 must be made of a polymeric or otherwise waterproof material, compatible with the material of the sole 616 and with the material of the membrane 613, at least in its perimetric part, so as to allow the provision of the perimetric area 626a for providing a waterproof seal directly with the lower flap or edge 617 of the membrane of the upper.

In order to complete the waterproof seal of the shoe, in this case also the connecting element 650 is impregnated with adhesives or sealants, such as for example silicone adhesives, thermoplastic adhesives or reactive hot-melt PU adhesives, such as for example the adhesive known by the trade name IPATHERM S 14/176 or equivalent of H.B. Fuller, or spread with latex (latex coating) or with polyurethane (PU coating), so as to provide a perimetric sealing area 626b with respect to the waterproof insole.

In any case, the insole 614 is associated hermetically with the sole 616 and with the lower flap or edge 617 of the membrane 613 only at the perimetric parts, without affecting the central part intended for vapor permeation, which must therefore be vapor-permeable or perforated.

In order to further strengthen the assembly margin of the membrane, it can be advantageous to apply directly to the lower flap or edge of the membrane 613, for example after association of the membrane with the upper 612, a waterproof reinforcement element 651, for example a preferably elastic waterproof heat-sealing tape, made of synthetic material.

In practice it has been found that the invention thus described achieves the intended aim and objects.

The present invention in fact provides a shoe which is completely waterproof and permeable to water vapor and is manufactured so as to avoid even the slightest lateral infiltration of water from the sole into the foot insertion region.

This is allowed by the particular surface coupling of the membrane to the upper, which is ensured appropriately by the pressing action and by the presence of special shapes. Such shapes in fact allow to waterproof effectively also the critical points determined by the stitched seams and in particular by the overlaps of the different elements that compose an upper for shoes. Such waterproofing of the upper allows to avoid the accumulation of water between the upper and the lining of the shoe.

Moreover, the association of the membrane with the upper so that the lower flap of the membrane protrudes from the lower edge of the upper allows the creation of a sealing area in this region with the lower part of the shoe, in practice preventing water from infiltrating at the surface interface between the upper and the membrane and between the membrane and the lower part of the shoe.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and the state of the art.

The disclosures in Swiss Patent Application No. 00538/07 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A method for manufacturing a waterproof and vapor-permeable shoe, comprising:
    preparing a semi-manufactured component of an upper for a shoe, such that the semi-manufactured component is completely open to be spread out on a flat surface;
    arranging on an internal part of said semi-manufactured component of the upper a waterproof and vapor-permeable membrane;
    preparing adhesive bonding between the semi-manufactured component of the upper and the membrane so as to not inhibit vapor-permeability of the membrane;
    preparing one or more shapes, which are substantially flat but are capable of deforming complementarily with respect to different thicknesses of stitched seams and of superimposed parts which constitute an outer surface of said semi-manufactured component of the upper;
    firmly coupling said membrane to said semi-manufactured component of the upper, with an outer part of said semi-manufactured component arranged so that the outer surface rests on the one or more shapes;
    finishing said upper by making the upper assume a correct three-dimensional configuration and coupling the upper with an insole; and
    coupling a sole with the waterproofed upper and with the insole.

2. The method according to claim 1, wherein the finishing of the upper comprises providing the missing couplings for the waterproofed upper.

3. The method according to claim 1, further comprising:
    applying to the upper of said membrane, which is coupled, without compromising its vapor permeation of the membrane, one or more meshes made of synthetic material and/or other protective elements or supporting elements which allow passage of sealing materials.

4. The method according to claim 1, wherein elements which constitute said upper are already waterproof replace part of said membrane, a waterproof seal being provided between a remainder of said membrane and said waterproof elements.

5. The method according to claim 4, comprising an overlap and a seal of said membrane with respect to said waterproof elements along 5.0-10.0 mm or a stitched seam which is waterproofed by a waterproof taping.

6. The method according to claim 1, wherein a waterproof toe cap replaces part of said membrane at the tip of the shoe, a waterproof seal being provided between a remainder of said membrane and said waterproof toe cap.

7. The method according to claim 6, comprising an overlap and a seal of said membrane with respect to said waterproof toe cap over 5.0-10.0 mm or a stitched seam which is waterproofed by a waterproof tape.

8. The method according to claim 1, wherein a waterproof counter replaces part of said membrane at the heel of the shoe, a waterproof seal being provided between a remainder of said membrane and said waterproof counter.

9. The method according to claim 8, comprising an overlap and a seal of said membrane with respect to said waterproof counter over 5.0-10.0 mm or a stitched seam which is waterproofed by a waterproof tape.

10. The method according to claim 1, wherein for subsequent assembly of said upper with said membrane to the sole, a lower margin of the membrane extends beyond a margin of the upper.

11. The method according to claim 10, wherein a protruding margin is of 10-15 mm from a lower edge of the upper.

12. The method according to claim 1, wherein for assembly between the upper and the membrane, thermo-adhesive glue is distributed on a surface of said membrane in contact with the upper so as to not compromise vapor permeability of the membrane.

13. The method according to claim 12, wherein distribution of said adhesive is a distribution of powder of adhesive, or of spots of adhesive of hot-melt type, having a diameter from 0.1 to 2.0 mm and a density from 50 to 600 spots/cm$^2$.

14. The method according to claim 1, wherein said membrane is heated to 100-150° C. for 10 seconds so as to be firmly coupled to the upper by pressing at 6 bars.

15. The method according to claim 1, wherein adhesion is promoted by a perforated thermo-adhesive film to be applied between the membrane and the upper, so as to not prevent the vapor permeation of the assembly.

16. The method according to claim 1, wherein the upper is almost completely assembled, so that the upper can be spread out onto a flat surface.

17. The method according to claim 16, wherein said flat surface is made of a material which is capable of resuming its original shape after deformation and is temperature-resistant, or made of nitrile rubber, silicone, polychloroprene or microporous expanded EVA, so as to eliminate irregularities in thickness and ensure that an inner surface of the upper is flat during pressing.

18. The method according to claim 16, wherein said flat surface or shape is made of rigid materials which are resistant to temperature and pressure, a shape having small cavities which are complementary, at the overlaps of the elements, with respect to the differences in thicknesses or the stitched seams of the upper, to provide the inner surface of the upper, having a pressing surface of the membrane, that is flat.

19. The method according to claim 1, wherein inserts of the membrane are positioned in a region of a front tongue to provide a bellows tongue required to waterproof a tongue and prevent water from entering the shoe, said inserts being superimposed and sealed by sealing adhesives or tapings, which are applied by heat-welding.

20. The method according to claim 1, wherein a completion of adhesion between the upper and the membrane in the heel portion is performed by using a shoe manufacturing machine, which has a heated half-last and an air cushion which applies pressure to the upper and to the membrane, which are superimposed.

21. The method according to claim 1, wherein a vapor-permeable internal lining is associated with an inner surface of the membrane.

22. The method according to claim 21, wherein association of the vapor-permeable internal lining with the inner surface of the membrane occurs by adhesive bonding.

23. The method according to claim 1, wherein once the upper of the shoe has been closed, said sole is associated therewith by adhesive, an area for providing a waterproof seal with the sole being provided between the lower flap of the membrane and a lower edge of the upper.

24. The method according to claim 23, wherein said waterproof sealing area can be constituted by an adhesive material which is spread onto the lower edge of the upper, on the lower flap of the membrane, until it reaches the insole, in practice so as to form the sealing ring.

25. The method according to claim 23, wherein said sealing area is provided with sealing tapes or extensions of the lower edge of the upper, obtained by elements which are fixed to said upper by sewing or adhesive bonding.

26. The method according to claim 25, wherein said extensions, which are wide enough to reach the end of the membrane flap, must allow sealing, and are heat-sealing tapes or meshes made of synthetic material, mesh fabrics, weaved fabrics or three-dimensional fabrics, through which sealing materials, such as silicone or polyurethane adhesives, can pass, and the membrane must be applied after the coupling of said elements so as to waterproof the connecting point among the different materials.

27. The method according to claim 23, where a waterproof reinforcement element, or a waterproof heat-sealing tape, which is elastic and made of synthetic material, is applied directly to the inner surface of the lower edge of the membrane.

28. The method according to claim 1, wherein said sole is overmolded directly onto the upper part.

29. The method according to claim 23, wherein in order to further strengthen the assembly margin of the membrane, a waterproof reinforcement element, or a waterproof heat-sealing tape, which is elastic and made of synthetic material, is applied directly to the lower edge of the membrane.

30. The method according to claim 29, wherein said reinforcement element is applied directly to the lower edge of the membrane after the association of the membrane with the upper.

31. A waterproof and vapor-permeable shoe, manufactured with a method according to claim 1.

\* \* \* \* \*